(12) United States Patent
Wafzig et al.

(10) Patent No.: US 11,221,060 B2
(45) Date of Patent: Jan. 11, 2022

(54) TRANSMISSION FOR A MOTOR VEHICLE

(71) Applicant: ZF Friedrichshafen AG, Friedrichshafen (DE)

(72) Inventors: Jürgen Wafzig, Bermatingen (DE); Michael Wechs, Neißensberg (DE); Timo Wehlen, Friedrichshafen (DE); Johannes Kaltenbach, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 770 days.

(21) Appl. No.: 16/060,479

(22) PCT Filed: Nov. 11, 2016

(86) PCT No.: PCT/EP2016/077431
§ 371 (c)(1),
(2) Date: Jun. 8, 2018

(87) PCT Pub. No.: WO2017/097534
PCT Pub. Date: Jun. 15, 2017

(65) Prior Publication Data
US 2018/0363730 A1    Dec. 20, 2018

(30) Foreign Application Priority Data
Dec. 9, 2015   (DE) ............... 10 2015 224 647.7

(51) Int. Cl.
*F16H 3/00*      (2006.01)
*B60K 6/48*      (2007.10)
(Continued)

(52) U.S. Cl.
CPC ............ *F16H 3/006* (2013.01); *B60K 6/48* (2013.01); *B60K 6/547* (2013.01); *F16H 3/093* (2013.01);
(Continued)

(58) Field of Classification Search
CPC .......... F16H 3/006; F16H 3/093; B60K 6/48; B60K 6/547
(Continued)

(56) References Cited

U.S. PATENT DOCUMENTS 8,955,411 B2 *  2/2015  Raisch ................... B60K 6/547
                                                     74/661
8,960,033 B2    2/2015  Kaltenbach et al.
(Continued)

FOREIGN PATENT DOCUMENTS

CN    201849308 U      6/2011
DE    102008000647 A1  9/2009
DE    102011005532 A1  9/2012

OTHER PUBLICATIONS

German Search Report DE102015224647.7 dated Dec. 16, 2016. (8 pages).
(Continued)

*Primary Examiner* — Ha Dinh Ho
(74) *Attorney, Agent, or Firm* — Dority & Manning, P.A.

(57) ABSTRACT

A transmission (1) for a motor vehicle includes at least one input shaft (2) which can be connected to an internal combustion engine (VM) in a rotationally fixed manner and with at least one input shaft power transmission element, a first shaft (3) including at least one power transmission element, a second shaft (4) including at least one other power transmission element, and a transmission output shaft (5) which is engaged with the first shaft (3) and the second shaft (4). The transmission (1) includes at least one gear plane (RE), in which the at least one input shaft power transmission element is engaged with the at least one power transmission element and with the at least one other power transmission element. The transmission (1) includes precisely two gear planes, and the power transmission element
(Continued)

and the other power transmission element are each an idler gear.

39 Claims, 11 Drawing Sheets

(51) Int. Cl.
*B60K 6/547* (2007.10)
*F16H 3/093* (2006.01)
*B60K 6/54* (2007.10)
*F16H 3/08* (2006.01)

(52) U.S. Cl.
CPC ............ *B60K 2006/4816* (2013.01); *B60K 2006/4825* (2013.01); *B60K 2006/541* (2013.01); *F16H 2003/0807* (2013.01); *F16H 2003/0931* (2013.01); *F16H 2200/0043* (2013.01); *F16H 2200/0047* (2013.01); *F16H 2200/0052* (2013.01); *Y02T 10/62* (2013.01)

(58) Field of Classification Search
USPC .......................................... 74/330, 331, 661
See application file for complete search history.

(56) References Cited

U.S. PATENT DOCUMENTS

| | | | | |
|---|---|---|---|---|
| 9,789,754 | B2* | 10/2017 | Zhu | F16H 3/006 |
| 9,834,083 | B2* | 12/2017 | Blessing | B60K 6/405 |
| 10,144,309 | B2* | 12/2018 | Leng | B60L 15/2054 |
| 10,781,914 | B2* | 9/2020 | Aulin | B60K 6/387 |
| 2010/0311540 | A1* | 12/2010 | Hellenbroich | B60L 1/003 |
| | | | | 477/5 |

OTHER PUBLICATIONS

International Search Report (English Translation) PCT/EP2016/077431, dated Jan. 10, 2017. (2 pages).

* cited by examiner

| Gear | K1 | K2 | S2 | S3 | S4 | S5 | SK |
|---|---|---|---|---|---|---|---|
| R | Driven exclusively by the electric machine | | X | | | | |
| 1 | | | X | | | | |
| 2 | X | | X | | | | |
| 3 | | X | | X | | | |
| 4 | X | | | | X | | |
| 5 | | X | | | | X | |
| 6 | | X | | | X | | X |

Fig. 5

| Gear | K1 | K2 | S5 | S2 | S3 | S4 | SK |
|------|----|----|----|----|----|----|----|
| R    | X  |    |    |    |    | X  |    |
| 1    | X  |    | X  |    |    |    | X  |
| 2    |    | X  | X  |    |    |    |    |
| 3    | X  |    |    | X  |    |    |    |
| 4    |    | X  |    |    | X  |    |    |

Fig. 11

TRANSMISSION FOR A MOTOR VEHICLE

FIELD OF THE INVENTION

The invention relates generally to a transmission for a motor vehicle, including at least one input shaft which can be connected to an internal combustion engine in a rotationally fixed manner and includes at least one input shaft power transmission element, a first shaft including at least one power transmission element, a second shaft including at least one other power transmission element, and a transmission output shaft which is engaged with the first shaft and the second shaft, wherein the transmission includes at least one gear plane, in which the at least one input shaft power transmission element is engaged with the at least one power transmission element and with the at least one other power transmission element.

The invention also relates generally to a hybrid drive including such a transmission and to a motor vehicle including the transmission or the hybrid drive.

BACKGROUND

The prior art describes the use of transmissions in various vehicles, inter alia, small vehicles as well. There is a multitude of small vehicles, however, in which there is little installation space available for the transmission. Since the size of transmissions, in particular transmissions used in hybrid drives, is very large in some cases, these transmissions cannot be installed in small vehicles.

SUMMARY OF THE INVENTION

Example aspects of the invention provide a transmission for a motor vehicle, which has a small size, and therefore the transmission can be installed in small vehicles having little available installation space.

A transmission of the type described above, includes at most two, in particular precisely, two gear planes, and the one power transmission element and the other power transmission element are each designed as an idler gear.

By providing at most two gear planes, a short axial installation length of the transmission results, and therefore the transmission can be installed in small vehicles. In particular, the transmission can be installed in front-transverse vehicles having little axial installation space.

In one particular embodiment, in a first gear plane, a first input shaft power transmission element is engaged with a first idler gear and with yet another first idler gear. In addition, in a second gear plane, a second input power transmission element is engaged with a second idler gear and with yet another second idler gear. The input shaft power transmission element, in particular the first and the second input shaft power transmission elements, can be a fixed gear.

The gear plane corresponds to a plane of action, in which the input shaft power transmission element, the idler gear, and the other idler gear are engaged. In this case, the input shaft power transmission element, the idler gear, and the other idler gear can be engaged in a gear plane, independently of whether the axes of rotation of the input shaft power transmission element, the idler gear, and the other idler gear extend in parallel to each other or crosswise with respect to each other.

An idler gear is a gear, for example a gearwheel, which is associated with a shaft, but is not connected to the shaft in a rotationally fixed manner. This means, the shaft can rotate relative to the idler gear. A rotationally fixed connection between the idler gear and the shaft can take place by an engagement device which, in one position, implements a rotationally fixed connection between the idler gear and the shaft. A power transmission element designed as a fixed gear, however, is connected to the input shaft in a rotationally fixed manner. This means, an engagement device is not required for the rotationally fixed connection of the fixed gear to the input shaft.

A rotationally fixed connection is understood to be a connection between two components, which is formed in such a way that the two components to be connected to each other always have the same rotationally speed. This is possible only when an engagement device is not arranged between the two interconnected components; otherwise, in the disengaged condition of the engagement device, the rotational speeds of the two components can differ from each other. In addition, a connection between two components is referred to as "connectable in a rotationally fixed manner" within the meaning of the invention when an engagement device is arranged between the two components to be connected to each other.

In one particular embodiment, a first input shaft of the at least one input shaft can be a hollow shaft. In addition, a second input shaft of the at least one input shaft can be a solid shaft. In this case, in the first gear plane, the first input power transmission element can be connected to the hollow shaft in a rotationally fixed manner and/or, in the second gear plane, the second input shaft power transmission element can be connected to the solid shaft in a rotationally fixed manner. The hollow shaft and the solid shaft can be arranged coaxially to each other, wherein the solid shaft can be partially enclosed by the hollow shaft. By designing the input shafts as a solid shaft and a hollow shaft and due to the coaxial arrangement of the input shafts with respect to each other, the axial length of the transmission can be reduced.

The transmission can include at least three, in particular precisely three or precisely four engagement devices. In this case, a first engagement device can be arranged in such a way that, in an engaged position, the first other idler gear is connected to the second shaft in a rotationally fixed manner. The first engagement device can be designed as a single shift element. This means, the first engagement device includes a first shift element, wherein, in an engaged position of the first shift element, the first other idler gear is connected to the second shaft in a rotationally fixed manner.

A second engagement device can be arranged in such a way that, in an engaged position, a first single component of the first gear plane is connected to a second single component of the second gear plane in a rotationally fixed manner. The first single component can be the first idler gear or the first other idler gear. The second single component can be the second idler gear or the second other idler gear. The rotationally fixed connection of the first single component of the first gear plane to the second single component of the second gear plane can take place in such a way that the first single component of the first gear plane and the second single component of the second gear plane are not connected to the first shaft or to the second shaft in a rotationally fixed manner.

The second engagement device can be advantageously designed in such a way that, in an engaged first position, the second other idler gear is connected to the second shaft in a rotationally fixed manner and, in an engaged second position, the second other idler gear is connected to the first other idler gear in a rotationally fixed manner. The second engagement device can be designed as a double shift element. This means, the second engagement device includes a second and a third shift element, wherein, in an engaged position of the second shift element, the second other idler gear is connected to the second shaft in a rotationally fixed manner and, in an engaged position of the third shift element, the second other idler gear is connected to the first other idler gear in a rotationally fixed manner.

In addition, the transmission can include a third engagement device. The third engagement device can be arranged in such a way that the input shaft can be connected to the internal combustion engine in a rotationally fixed manner by the third engagement device. In particular, in an engaged first position of the third engagement device, the hollow shaft can be connected to the internal combustion engine in a rotationally fixed manner by the third engagement device. In an engaged second position of the third engagement device, the solid shaft can be connected to the internal combustion engine in a rotationally fixed manner. The third engagement device can be designed as a double shift element, in particular as a dual clutch, and can include a fourth and a fifth shift element. The provision of the dual clutch offers the advantage, in turn, that the axial length of the transmission can be reduced. In this case, the hollow shaft or the solid shaft can be connected to the internal combustion engine in a rotationally fixed manner by the fourth shift element. The solid shaft or the hollow shaft can be connected to the internal combustion engine in a rotationally fixed manner by the fifth shift element.

A fourth engagement device can be present and can be arranged in such a way that, in a first engaged position, the first idler gear is connected to the first shaft in a rotationally fixed manner and, in a second engaged position, the second idler gear is connected to the first shaft in a rotationally fixed manner. The engagement device can include a sixth and a seventh shift element. In an engaged position of the sixth shift element, the first idler gear is connected to the first shaft in a rotationally fixed manner. In an engaged position of the seventh shift element, the second idler gear is connected to the first shaft in a rotationally fixed manner.

The fourth engagement device can be designed as a double shift element. In this case, the engagement device includes an engagement means, via which the sixth or the seventh shift element can be engaged. The engagement means can be designed in such a way that, upon engagement of one shift element, the other shift element remains disengaged. Alternatively, the fourth engagement device can include two single shift elements, each of which can be engaged via a separate engagement means.

At least one shift element can be designed as a shift element operating in a form-fit manner. In particular, the shift element can be designed as a shifting dog. In addition, at least one shift element can be designed as a shift element operating in a friction-locking manner. In addition, at least one shift element can be a shift element designed as a synchronizer.

In one highly particular embodiment, the same idler gear, in particular the first idler gear and/or the second idler gear, can be associated with multiple gears. Alternatively or additionally, the same other idler gear, in particular the first other idler gear and/or the second other idler gear, can be associated with multiple gears. Due to the design of the transmission, it can be achieved that the idler gear and/or the other idler gear can each be used for at least two gears, and therefore, due to the possible multiple utilizations of the idler gear and/or the other idler gear, a high number of gears can be implemented with a low number of gear planes.

In one particular embodiment, the transmission can include a connecting means, via which an electric machine can be coupled to the transmission in a rotationally fixed manner. The electric machine can be an electric motor. In addition, the transmission can include a drive shaft which is connected to the third engagement device in a rotationally fixed manner. The drive shaft can therefore be connected to the at least one input shaft in a rotationally fixed manner by the third engagement device. The coupling to an electric machine offers the advantage that an electric starting operation in the forward operation is possible. This offers the advantage that the dual clutch does not need to be designed for a starting operation and, therefore, the wear volume to be provided can be reduced. In addition, the provision of the electric machine offers the advantage that a purely electric reverse operation is possible and, therefore, a mechanical reverse gear does not need to be provided, thereby simplifying the design of the multi-stage transmission. A direction of rotation of the electric machine, in particular a rotor of the electric machine, in a reverse gear can be opposite the direction of rotation of the electric machine in the forward gear. This means, in a forward operation of the transmission, the electric machine rotates in another direction than in a reverse operation of the transmission.

The connecting means can be connected to the input shaft in a rotationally fixed manner. Alternatively, the connecting means can be connected to the third engagement device or to the hollow shaft in a rotationally fixed manner. The connection of the connecting means to the hollow shaft offers the advantage that a starting operation by the electric machine is possible without the need to engage the third engagement device.

The electric machine can be detachably coupled to the transmission by the connecting means. In addition, the electric machine can be directly or indirectly coupled or couplable to the connecting means. For example, in order to achieve a favorable design of the electric machine with respect to rotational speed and torque, it can be advantageously provided that the electric machine is coupled or couplable to the connecting means via a pre-reduction gear. It is particularly advantageous when the pre-reduction gear is designed in such a way that the electric machine can be operated at higher rotational speeds, and therefore the torque which the electric machine must output is lower.

In one particularly advantageous embodiment, the electric machine is arranged in a housing, in particular in the housing of the transmission. In particular, in such an embodiment, the electric machine can be advantageously arranged coaxially to the further input shaft. Alternatively, it is also possible that the electric machine is arranged axially parallel to the further input shaft and is drivingly coupled, for example, via a traction mechanism drive or spur gearing and/or a bevel gear drive.

The transmission can include yet another power transmission element which is engaged with the input power transmission element and with the idler gear and/or with the other idler gear. In particular, the further power transmission element can be arranged in such a way that it is engaged with the first input power transmission element and with the first idler gear or with the first other idler gear. The further power transmission element can be arranged between the input shaft power transmission element, in particular the first input shaft power transmission element, and the idler gear, in particular the first idler gear, or the other idler gear, in particular the first other idler gear. By providing the further power transmission element, a mechanical reverse gear can be provided, and therefore a reverse operation can be implemented purely by utilizing the internal combustion engine. This means, the transmission does not need to include an electric machine. This is advantageous, in particular, since it no longer needs to be considered whether sufficient energy for the starting operation is present in an electric accumulator. The transmission without an electric machine can be preferably utilized in vehicles having a limited overall gear ratio and/or a limited maximum speed.

The transmission can be designed in such a way that a purely electric forward operation and a purely electric reverse operation can be implemented using the same gear. In particular, a purely electric reverse operation and a purely electric forward operation can be implemented via a second gear. The transmission can include at least one, in particular precisely one forward gear for a purely electric forward operation. In addition, the transmission can include at least one, in particular precisely one reverse gear for a purely electric or a purely internal combustion engine-driven reverse operation. Moreover, the transmission can include at least four, in particular precisely four or precisely five forward gears for a forward operation with an internal combustion engine or for a forward operation with an internal combustion engine and an electric machine. The purely electric forward operation or reverse operation can take place by exclusively utilizing the electric machine. In the end, a transmission is obtained, with the aid of which a purely electric operation, a purely internal combustion engine-driven operation, or a hybrid operation can be implemented in a large speed range.

A purely electric forward operation or a purely electric reverse operation can be implemented by engaging the first shift element, wherein the remaining shift elements are disengaged. Alternatively or additionally, a purely electric forward operation or a purely electric reverse operation can be implemented by engaging the first shift element and by engaging the fourth and/or fifth shift element, wherein the remaining shift elements are disengaged.

An engagement of the internal combustion engine can take place when the first shift element and the fourth shift element are engaged, wherein the remaining shift elements are disengaged. In particular, the ratios of the transmission are designed in such a way that, in a forward operation, an engagement of the internal combustion engine takes place at 10 km/h to 15 km/h, which corresponds to a ratio of a second forward gear.

In one highly particular embodiment, a reversing operation of the transmission, i.e., a repeated, in particular, switching between a forward operation and a reverse operation, is possible in a particularly simple way. A reversing operation is advantageous, in particular, when the vehicle is stuck in snow, for example. By the reversing operation, the vehicle is to be rocked free from the stuck position. A change-over from the forward operation to the reverse operation or vice versa can be implemented by actuating the fourth and the fifth shift elements. "Actuating" is understood to be a disengagement or an engagement of the shift element. The sixth and/or the seventh shift element can be engaged, wherein the remaining shift elements are disengaged. The reversing operation can therefore be implemented by exclusively actuating the two shift elements of the dual clutch. The sixth and/or the seventh shift element can be engaged only during the initial engagement of the forward gear or reverse gear and can remain engaged and/or is or are not actuated in the reversing operation.

The first shaft includes a first output gear and the second shaft includes a second output gear, wherein the first and the second output gears are connected to the transmission output shaft in a rotationally fixed manner.

In an advantageous way, the gear planes can be arranged, as viewed axially, in the direction of power flow, on the input side in the traction operation of the internal combustion engine coupled to the input shaft, in the sequence: first gear plane and second gear plane. The perspective therefore originates from the input side, in particular from the internal combustion engine and the transmission coupled to the internal combustion engine, in the direction of power flow.

Of particular advantage is a hybrid drive for a motor vehicle, which includes a transmission according to the invention, wherein the internal combustion engine is coupled to the at least one input shaft and the electric machine is coupled to the connecting means in a rotationally fixed manner. It is particularly advantageous when the internal combustion engine is coupled to the transmission, in particular to the input shaft of the transmission, via a separating clutch. In addition, a motor vehicle including the transmission according to the invention and/or including the hybrid drive are of particular advantage.

BRIEF DESCRIPTION OF THE DRAWINGS

The subject of the invention is schematically represented in the figures and is described in the following, wherein identical or identically operating elements are mostly provided with the same reference characters. Wherein:

FIG. 5 shows a shift matrix of the exemplary embodiments shown in FIGS. 2 to 4, FIG. 6 schematically shows a fifth exemplary embodiment of a hybrid drive according to the invention, including a transmission according to the invention for a motor vehicle, FIG. 7 schematically shows a sixth exemplary embodiment of a hybrid drive according to the invention, including a transmission according to the invention for a motor vehicle, FIG. 8 schematically shows a seventh exemplary embodiment of a hybrid drive according to the invention, including a transmission according to the invention for a motor vehicle, FIG. 9 schematically shows an eighth exemplary embodiment of a transmission according to the invention for a motor vehicle, FIG. 10 schematically shows a ninth exemplary embodiment of a transmission according to the invention for a motor vehicle, FIG. 11 schematically shows a shift matrix for the exemplary embodiments shown in FIGS. 6 to 10.

DETAILED DESCRIPTION

Figure 1:
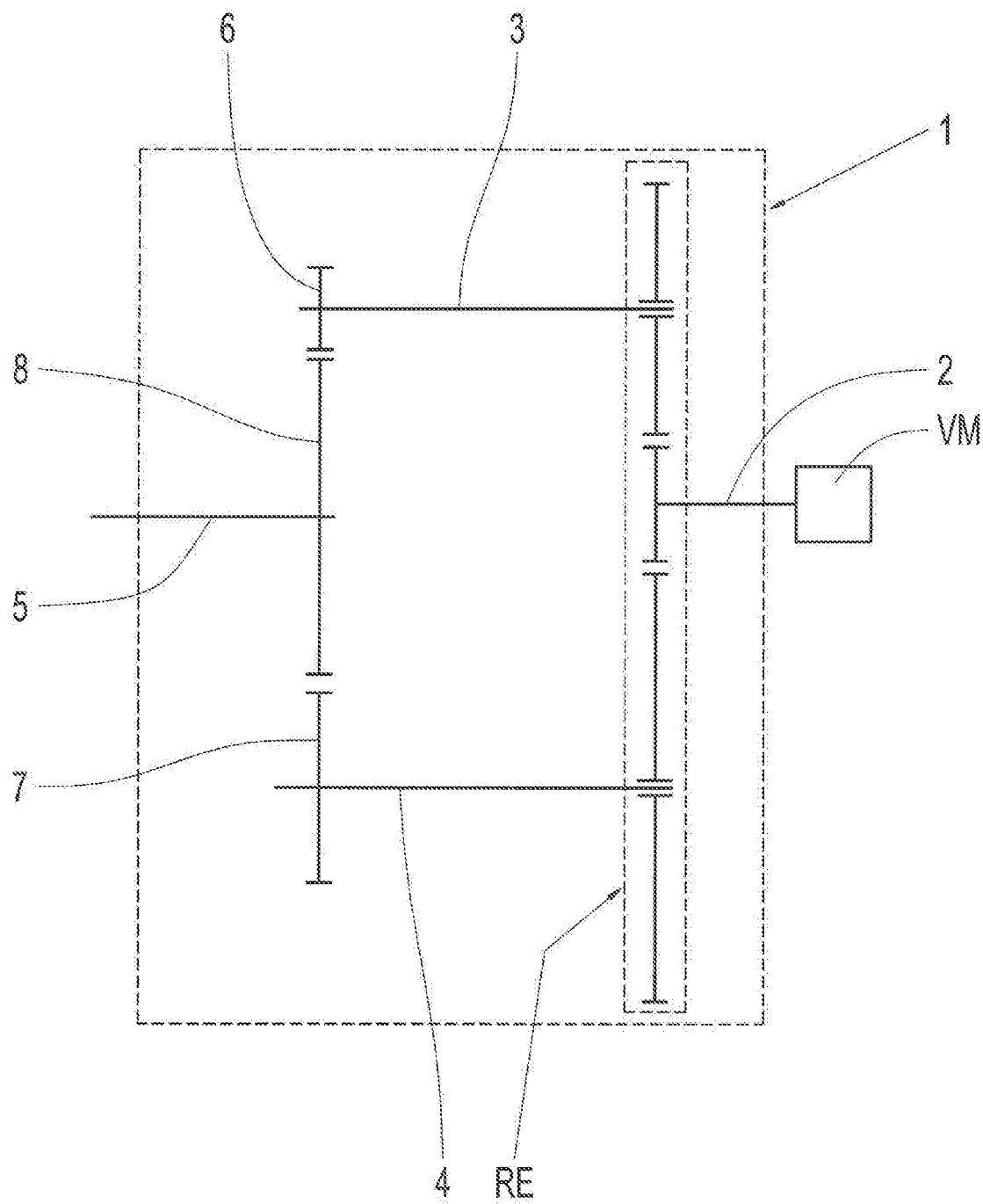
FIG. 1 schematically shows a first exemplary embodiment of a transmission according to the invention for a motor vehicle, FIG. 2 schematically shows a second exemplary embodiment of a hybrid drive according to the invention, including a transmission according to the invention for a motor vehicle, FIG. 3 schematically shows a third exemplary embodiment of a hybrid drive according to the invention, including a transmission according to the invention for a motor vehicle, FIG. 4 schematically shows a fourth exemplary embodiment of a hybrid drive according to the invention, including a transmission according to the invention for a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically shows a first exemplary embodiment of a transmission 1 according to the invention for a motor vehicle. The transmission includes an input shaft 2 which can be connected to an internal combustion engine VM in a rotationally fixed manner. In addition, the transmission 1 includes at least one input shaft power transmission element which is arranged on the side of the input shaft 2 facing away from the internal combustion engine VM and is connected to the input shaft 2 in a rotationally fixed manner. The input shaft power transmission element is designed as a fixed gear.

In addition, the transmission 1 includes a first shaft 3 and a second shaft 4. The first shaft 3 includes a power transmission element in the form of an idler gear. The second shaft 4 includes another power transmission element in the form of another idler gear. The transmission 1 has a single gear plane RE. In the gear plane RE, the input shaft power transmission element is engaged with the idler gear and with the other idler gear. A rotationally fixed coupling of the idler gear to the first shaft 3 and of the other idler gear to the second shaft 4 can take place by engagement devices which are not represented in FIG. 1.

The first shaft 3 includes a first output gear 6 on the end facing away from the idler gear. The second shaft 4 includes a second output gear 7 on the end facing away from the other idler gear. The first and the second output gears 6, 7 are engaged with an output shaft gear 8 which is connected to a transmission output shaft 5 in a rotationally fixed manner. The first and the second output gears 6, 7 and the output shaft gear 8 are each designed as fixed gears.

Figure 2:
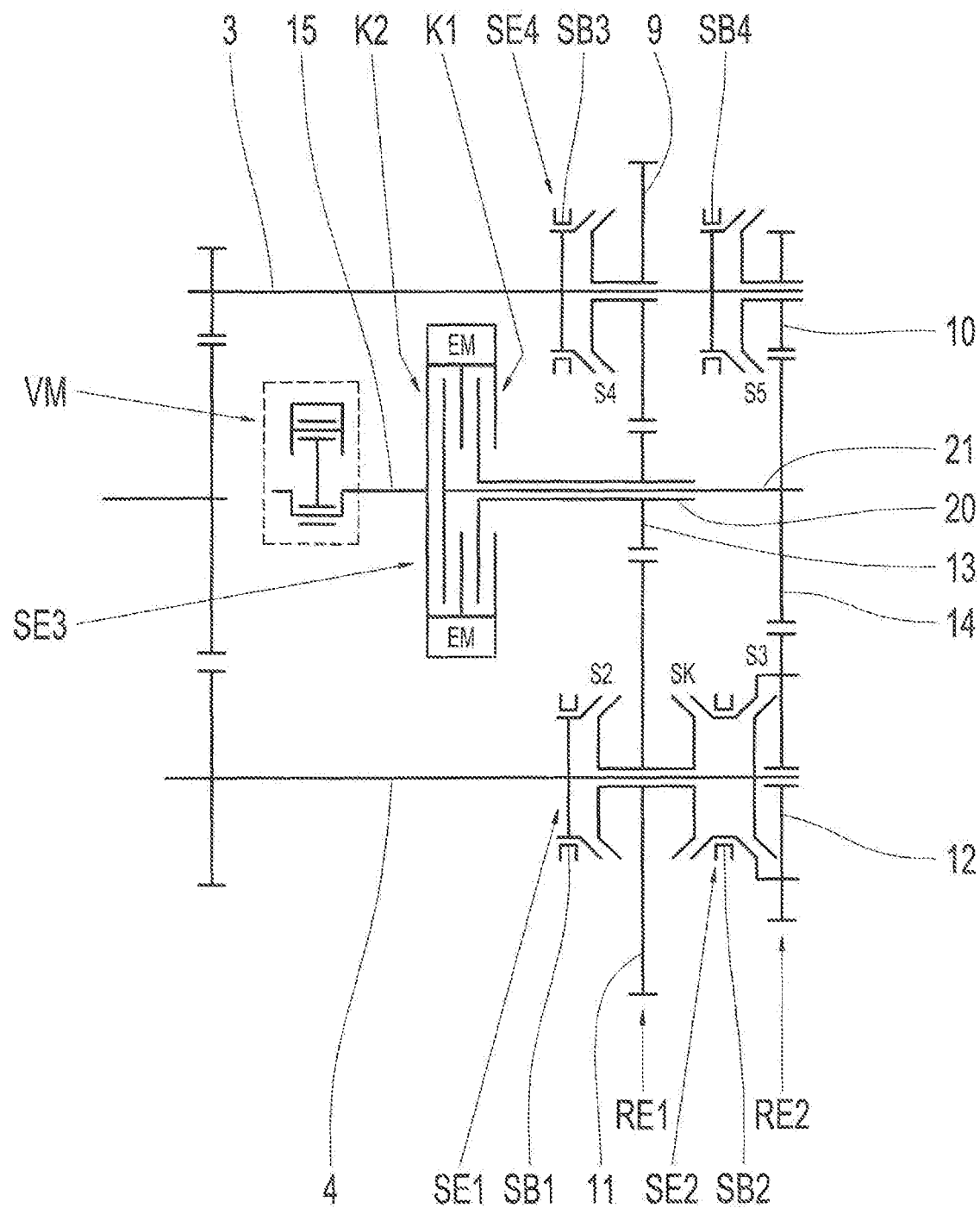

FIG. 2 schematically shows a second exemplary embodiment of a hybrid drive according to the invention, including a transmission according to the invention for a motor vehicle. The transmission includes two gear planes, namely a first gear plane RE1 and a second gear plane RE2. In addition, the transmission includes four engagement devices, namely a first engagement device SE1, a second engagement device SE2, a third engagement device SE3, and a fourth engagement device SE4.

A first input shaft is designed as a hollow shaft 20 and a second input shaft is designed as a solid shaft 21, which are arranged coaxially to each other. The hollow shaft 20 and the solid shaft 21 are arranged in such a way that one part of the solid shaft 21 is enclosed by the hollow shaft 20.

The first shaft 3 includes two power transmission elements which are designed as idler gears. In particular, the first shaft 3 includes a first idler gear 9 and a second idler gear 10 as the power transmission elements. The second shaft 4 includes two other power transmission elements which are designed as idler gears. In particular, the second shaft 4 includes a first other idler gear 11 and a second other idler gear 12 as the power transmission elements.

The hollow shaft 20 includes a first input shaft power transmission element and the solid shaft 21 includes a second input shaft power transmission element. In this case, the two input shaft power transmission elements are designed as fixed gears, wherein, in the following, the first input shaft power transmission element is referred to as the first fixed gear 13 and the second input shaft power transmission element is referred to as the second fixed gear 14. The first fixed gear 13 is connected to the hollow shaft 20 in a rotationally fixed manner. The second fixed gear 14 is connected to the solid shaft 21 in a rotationally fixed manner.

In the first gear plane RE1, the first fixed gear 13 intermeshes with the first idler gear 9 and the first other idler gear 11. In the second gear plane RE2, the second fixed gear 14 intermeshes with the second idler gear 10 and the second other idler gear 12.

The first engagement device SE1 is designed as a single shift element and includes a first shift element S2 and a first engagement means SB1. The first engagement means SB1 is axially movable along the second shaft 4 and can engage the first shift element S2. In the engaged condition of the first shift element S2, the first other idler gear 11 is connected to the second shaft 4 in a rotationally fixed manner. In the disengaged condition of the first shift element S2, no torque is transmitted from the first other idler gear 11 to the second shaft 4.

The second engagement device SE2 is designed as a double shift element and includes a second engagement means SB2, a second shift element S3, and a third shift element SK. The second engagement means SB2 is axially movable along the second shaft 4. In this case, the second shift element S3 or the third shift element SK is engaged, depending on the direction of motion of the second engagement means SB2. In the engaged condition of the second shift element S3, the second other idler gear 12 is connected to the second shaft 4 in a rotationally fixed manner. In the engaged condition of the third shift element SK, however, the second other idler gear 12 is connected to the first other idler gear 11 in a rotationally fixed manner. This means, when a third shift element SK is engaged, there is no rotationally fixed connection of the first other idler gear 11 and the second other idler gear 12 to the second shaft 4.

The third engagement device SE3 is designed as a double shift element, in particular as a dual clutch, and includes a fourth shift element K1 and a fifth shift element K2. In the engaged condition of the fourth shift element K1, the hollow shaft 20 is connected to the internal combustion engine VM in a rotationally fixed manner. In the engaged condition of the fifth shift element K2, the solid shaft 21 is connected to the internal combustion engine VM in a rotationally fixed manner.

The fourth engagement device SE4 includes two single shift elements. In particular, the fourth engagement device SE4 includes a sixth shift element S4 and a seventh shift element S5. In addition, the fourth engagement device SE4 includes a third engagement means SB3, which is associated with the sixth shift element S4, and a fourth engagement means SB4 which is associated with the seventh shift element S5. In the engaged condition of the sixth shift element S4, the first idler gear 9 is connected to the first shaft 3 in a rotationally fixed manner. In the engaged condition of the seventh shift element S5, the second idler gear 10 is connected to the first shaft 3 in a rotationally fixed manner.

In addition, the transmission includes a connecting means, which is not represented in FIG. 2 and via which the electric machine EM, preferably an electric motor, is coupled to the transmission in a rotationally fixed manner. In the embodiment represented in FIG. 2, the electric machine EM is connected to the third engagement device SE3 in a rotationally fixed manner via the connecting means.

Figure 3:
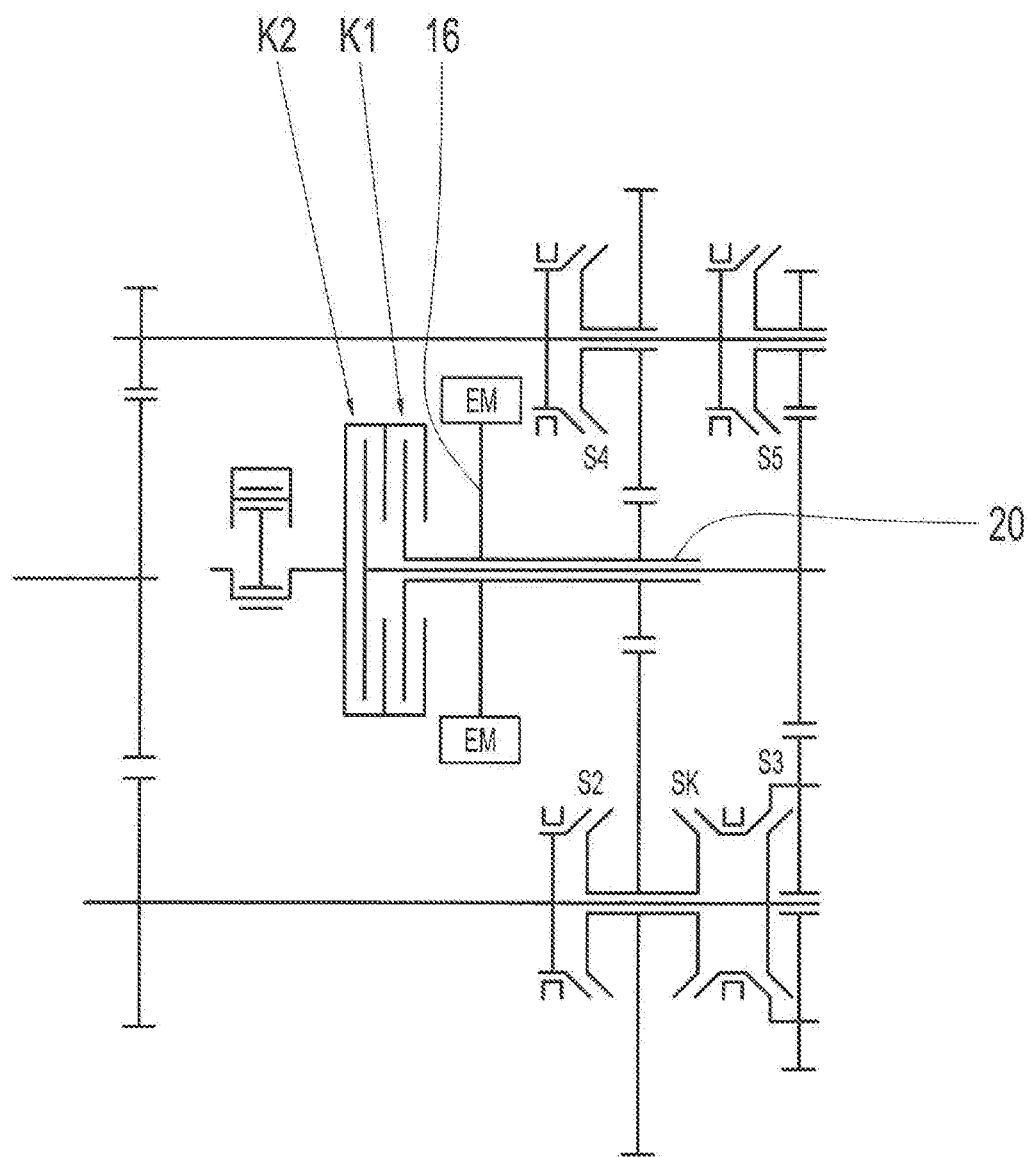

FIG. 3 schematically shows a third exemplary embodiment of a hybrid drive according to the invention, including a transmission according to the invention for a motor vehicle. The exemplary embodiment represented in FIG. 3 differs from the second exemplary embodiment represented in FIG. 2 with respect to the arrangement and coupling of the electric machine EM. In the third exemplary embodiment represented in FIG. 3, the electric machine EM is connected to the hollow shaft 20 in a rotationally fixed manner by the connecting means 16.

Figure 4:
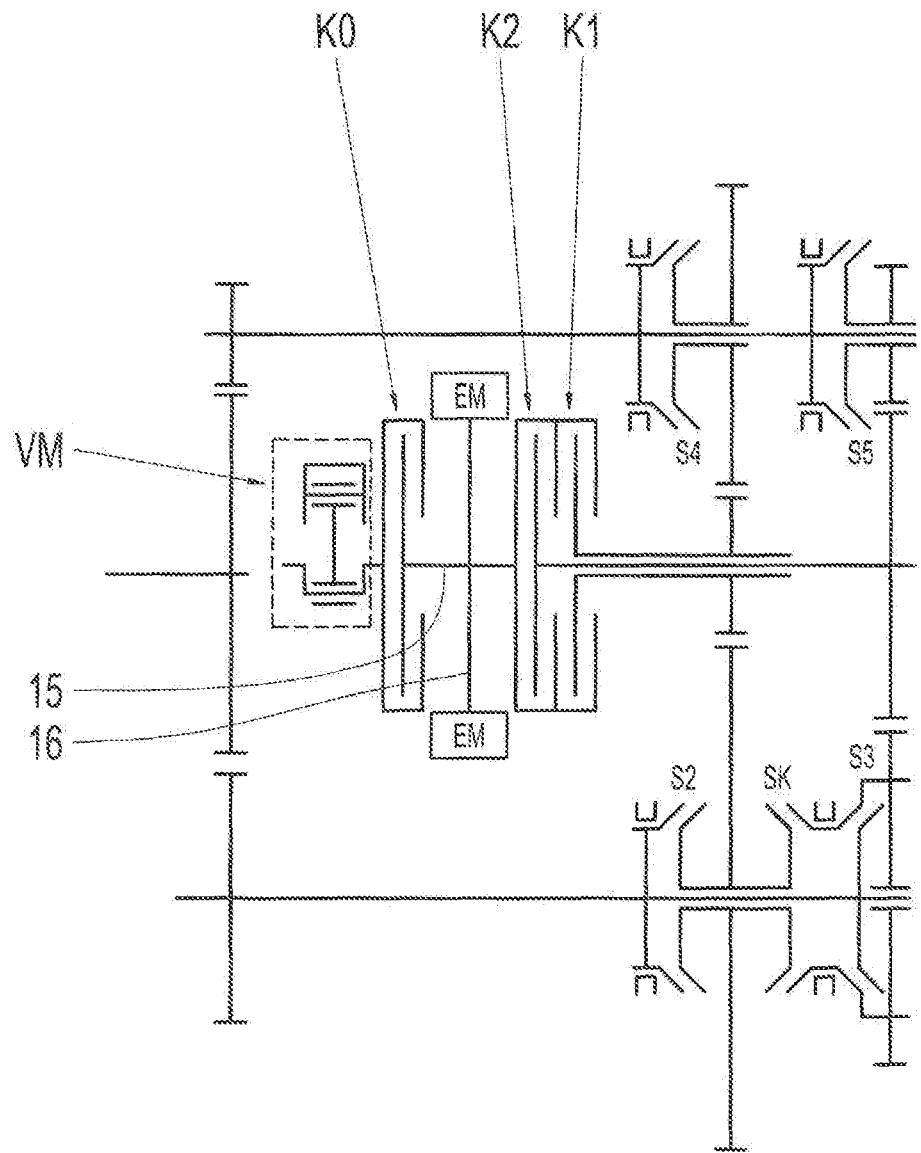

FIG. 4 schematically shows a fourth exemplary embodiment of a hybrid drive according to the invention, including a transmission according to the invention for a motor vehicle. The fourth exemplary embodiment differs from the third exemplary embodiment represented in FIG. 3 in that a separating clutch K0 is present, which is drivingly connected upstream from the third engagement device SE3 in traction operation. The separating clutch K0 is arranged between the internal combustion engine VM and the transmission and is connected to the internal combustion engine VM in a rotationally fixed manner. In addition, the separating clutch K0 is connected to the third engagement device SE3 in a rotationally fixed manner by an input shaft 15 of the transmission. The electric machine EM is connected to the input shaft 15 in a rotationally fixed manner via the connecting means 16.

The shift matrix for the transmission shown in FIGS. 2 to 4 is represented in FIG. 5. All three transmissions have one reverse gear for a purely electric reverse operation. In addition, all three transmissions have one forward gear for a purely electric forward operation. In all transmissions represented in FIGS. 2 to 4, the first forward gear is implemented for the purely electric forward operation and the reverse gear is implemented for the purely electric reverse operation by engaging the first shift element S2.

In the second exemplary embodiment represented in FIG. 2 and in the fourth exemplary embodiment represented in FIG. 4, in order to select the reverse gear, the fourth and/or the fifth shift element K1, K2 must be engaged in addition to the first shift element S2, wherein the remaining shift elements are disengaged. The purely electric forward gear in the third exemplary embodiment shown in FIG. 3 can be implemented exclusively by the engaged first shift element S2, however, without the need to engage further shift elements.

An internal combustion engine-assisted start takes place in a second forward gear. In this case, the first shift element S2 and the fourth shift element K1 are engaged, wherein the remaining shift elements are disengaged. A change-over from the second forward gear into a third forward gear can be implemented by disengaging the first and the fourth shift elements S2, K1 and by engaging the fifth and the second shift elements K2, S3, wherein the remaining shift elements are disengaged. A change-over from the third forward gear into a fourth forward gear can be implemented by disengaging the second and the fifth shift elements S3, K2 and by engaging the fourth and the sixth shift elements K1, S4, wherein the remaining shift elements are disengaged.

A change-over from the fourth forward gear into a fifth forward gear can be implemented by disengaging the fourth and the sixth shift elements K1, S4 and by engaging the fifth and the seventh shift elements K2, S5, wherein the remaining shift elements are disengaged. A change-over from the fifth forward gear into a sixth forward gear can be implemented by disengaging the seventh shift element S5 and engaging the third and the sixth shift elements SK, S4, wherein the fifth shift element K2 is engaged and the remaining shift elements are disengaged. In the sixth forward gear, the second other idler gear 12 is connected to the first other idler gear 11 in a rotationally fixed manner without there being a rotationally fixed connection to the second shaft 4.

Figure 6:
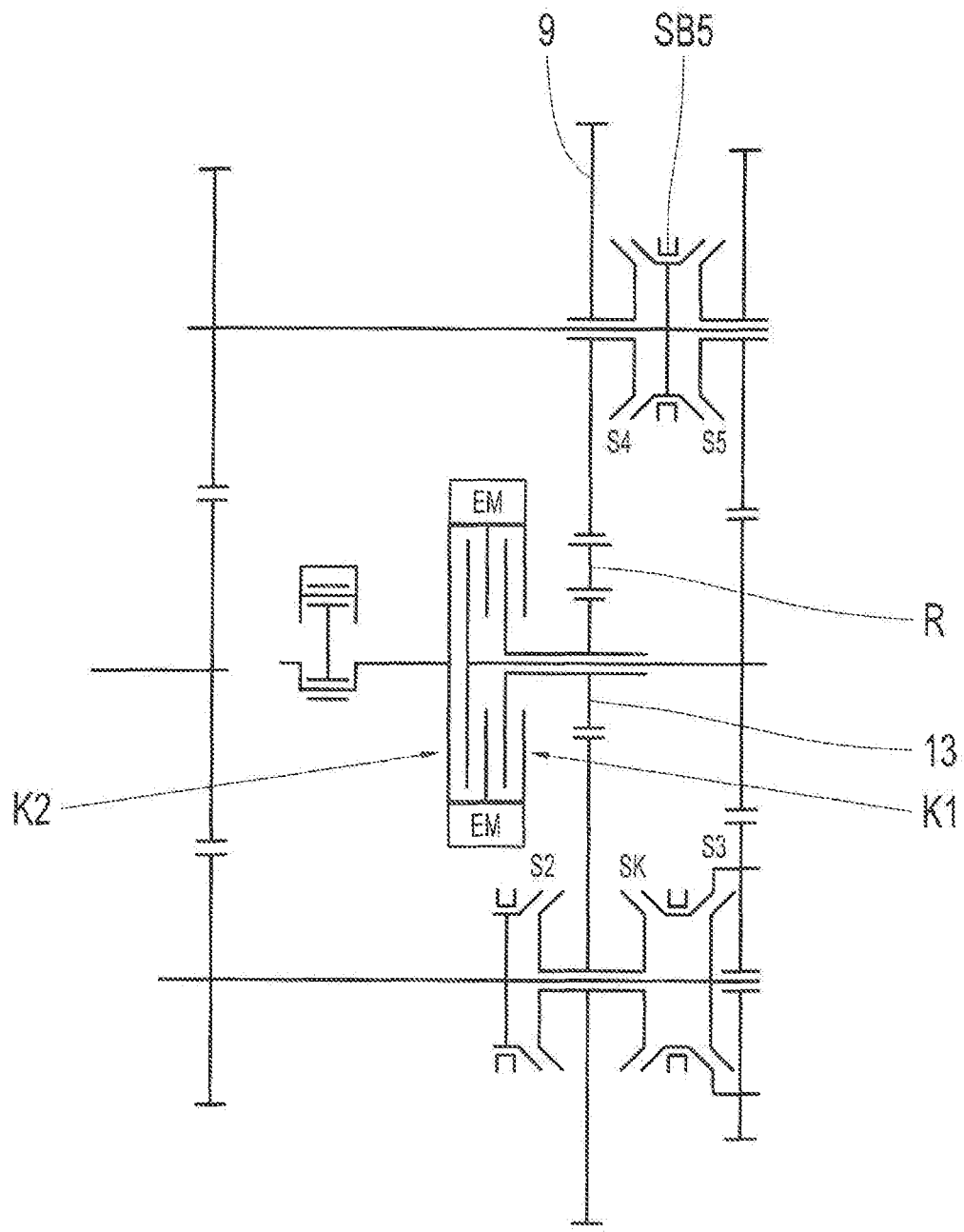

FIG. 6 schematically shows a fifth exemplary embodiment of a hybrid drive according to the invention, including a transmission according to the invention for a motor vehicle. The transmission differs from the second exemplary embodiment represented in FIG. 2 in that yet another power transmission element R is provided. The provision of yet another power transmission element R offers the advantage that the reverse operation must no longer take place purely electrically. In this exemplary embodiment, the reverse operation can be implemented purely electrically by utilizing the internal combustion engine. The further power transmission element is designed as a gearwheel and is arranged between the first fixed gear 13 and the first idler gear 9 in such a way that it is engaged with the first fixed gear 13 and the first idler gear 9.

Yet another difference is that the fourth engagement device SB4 is designed as a double shift element. The fourth engagement device SB4 includes a single engagement means, namely a single fifth engagement means SB5, wherein the sixth shift element S4 or the seventh shift element S5 is engaged depending on the direction of motion of the fifth engagement means SB5.

Figure 7:
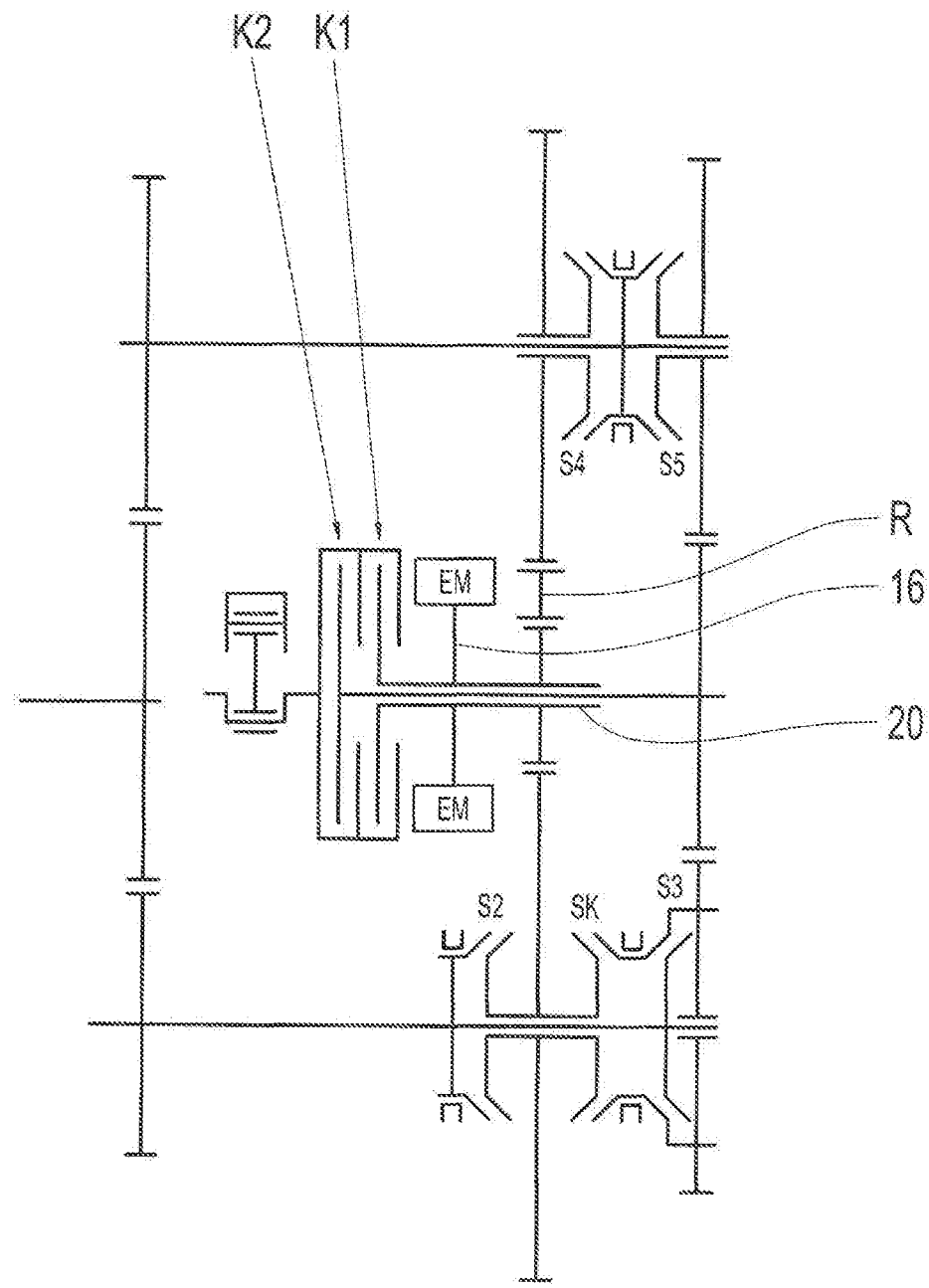

FIG. 7 schematically shows a sixth exemplary embodiment of a hybrid drive according to the invention, including a transmission according to the invention for a motor vehicle. This differs from the fifth exemplary embodiment represented in FIG. 6 by the arrangement and the coupling of the electric machine EM. In the sixth exemplary embodiment represented in FIG. 7, the electric machine EM is no longer connected to the third engagement device SE3 in a rotationally fixed manner. Instead, the electric machine EM is connected to the hollow shaft 10 in a rotationally fixed manner via the connecting means 16.

Figure 8:
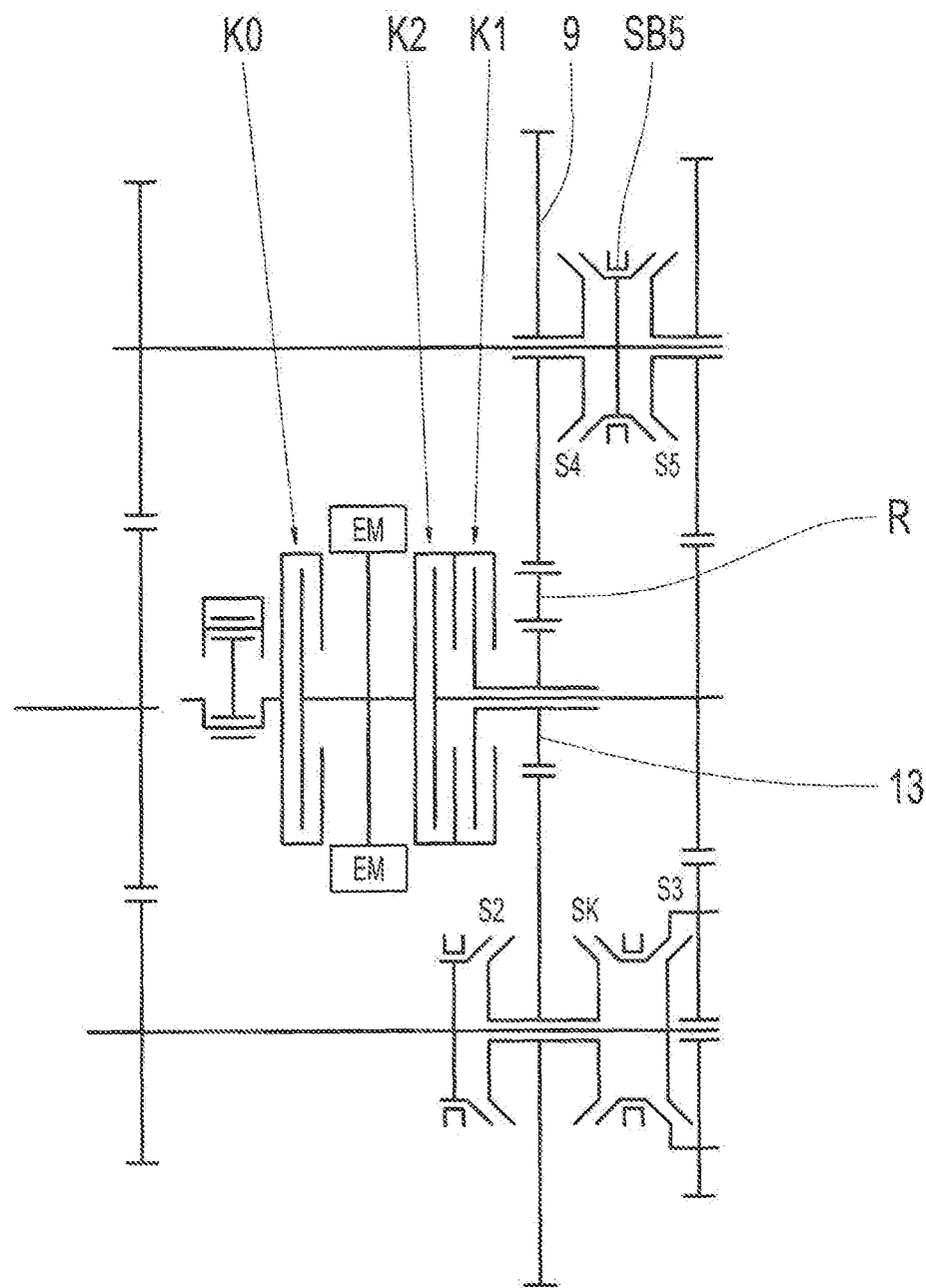

FIG. 8 schematically shows a seventh exemplary embodiment of a hybrid drive according to the invention, including a transmission according to the invention for a motor vehicle. The exemplary embodiment represented in FIG. 8 differs from the fourth exemplary embodiment represented in FIG. 4 in that yet another power transmission element R in the form of a gearwheel is provided, which is arranged between the first fixed gear 13 and the first idler gear 9. In this transmission, similarly to the sixth exemplary embodiment shown in FIG. 7, a reverse operation can be implemented purely by utilizing the internal combustion engine.

Yet another difference is that the fourth engagement device SB4 is designed as a double shift element. The fourth engagement device SB4 includes a single engagement means, namely a single fifth engagement means SB5, wherein the sixth shift element S4 or the seventh shift element S5 is engaged depending on the direction of motion of the fifth engagement means SB5.

Figure 9:
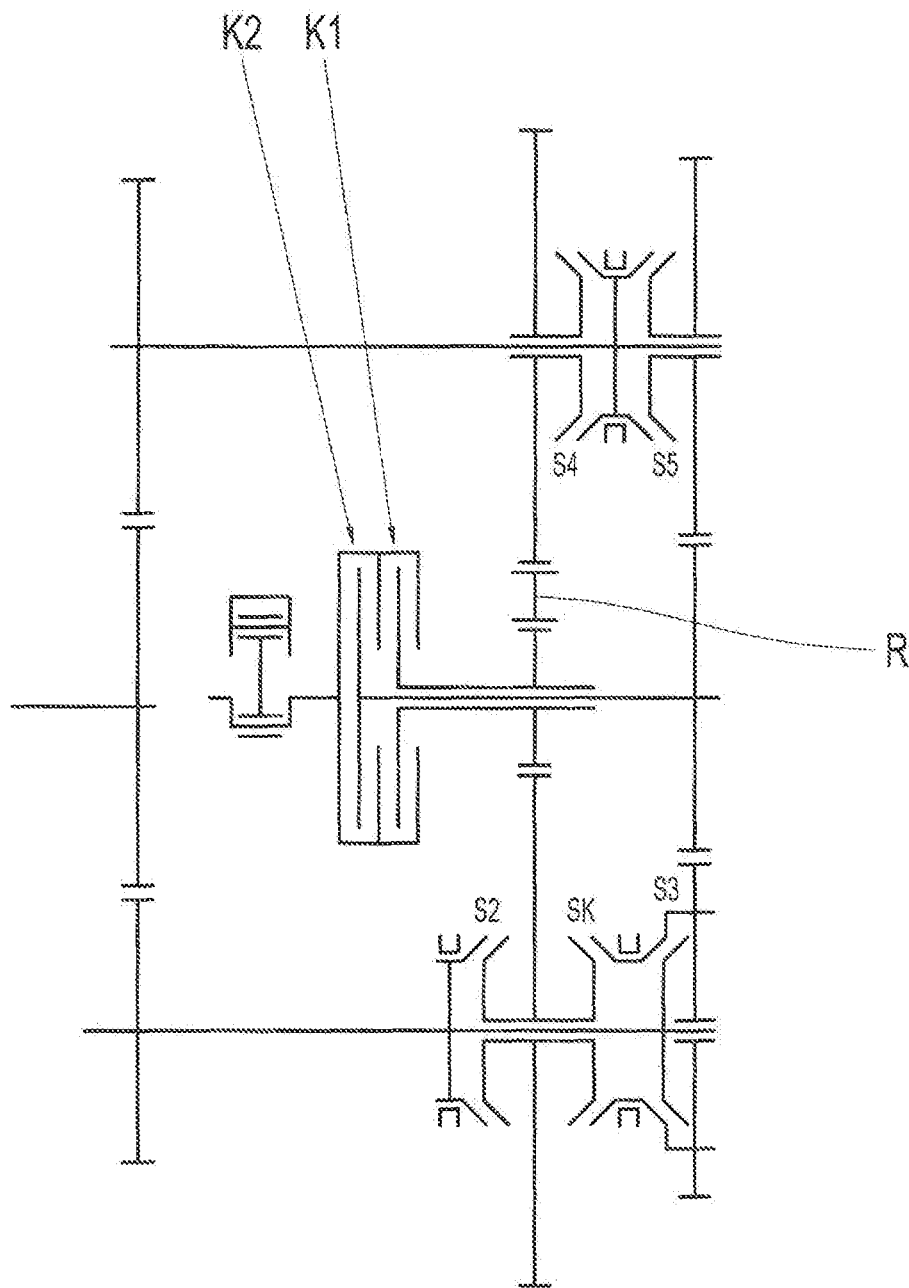

FIG. 9 shows an eighth exemplary embodiment of a transmission according to the invention. This differs from the fifth exemplary embodiment shown in FIG. 6 in that no electric machine is provided. This means, in the case of the transmission represented in FIG. 9, a forward operation and a reverse operation are implemented purely by utilizing the internal combustion engine.

Figure 10:
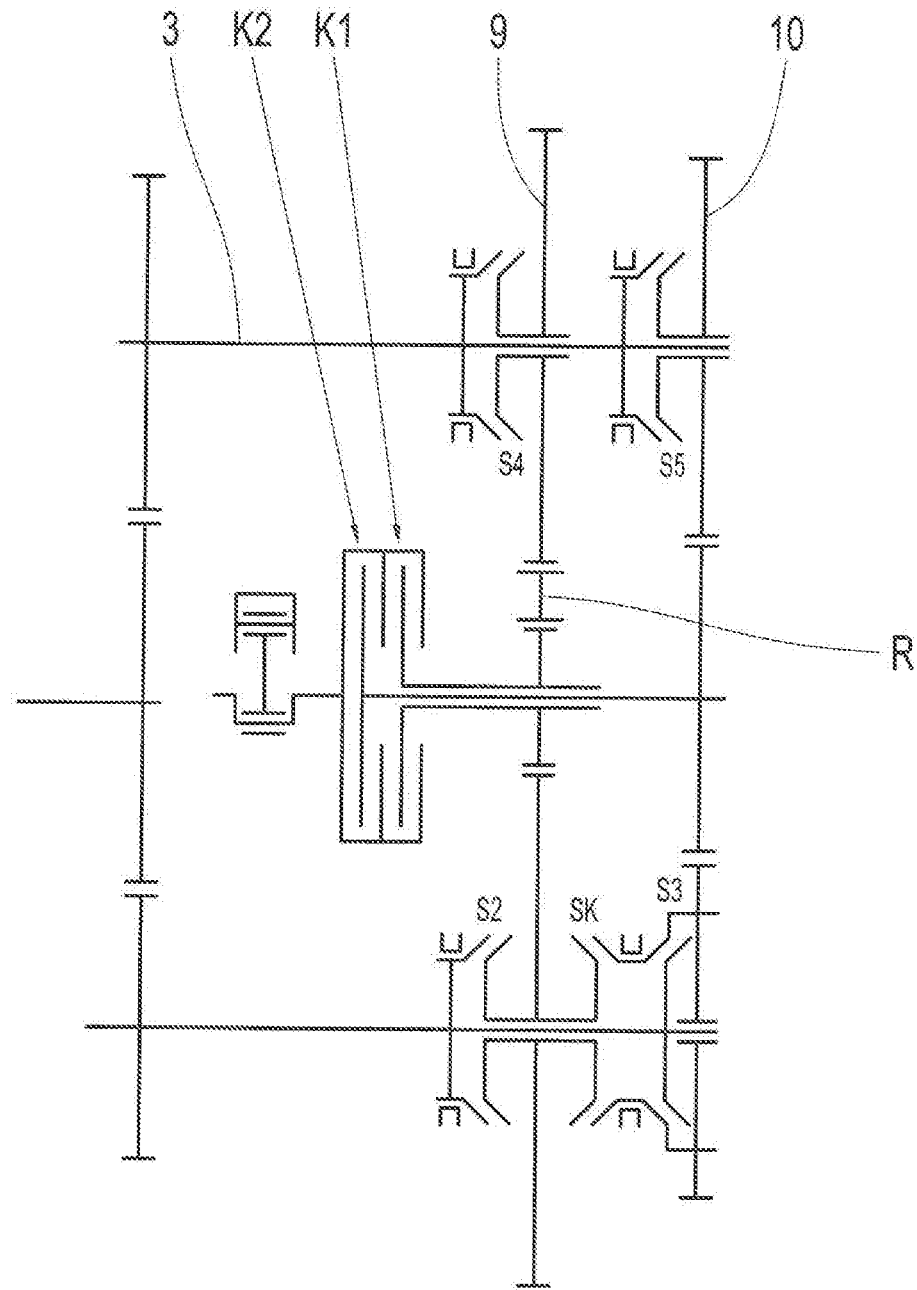

FIG. 10 shows a ninth exemplary embodiment of a transmission according to the invention. This differs from the eighth exemplary embodiment represented in FIG. 9 with respect to the design of the fourth engagement device SE4. In contrast to the eighth exemplary embodiment represented in FIG. 9, the fourth engagement device SE4 is not designed as a double shift element. Instead, the fourth engagement device includes two single shift elements, namely the sixth shift element S4 and the seventh shift element S5, each of which can be actuated via a separate engagement means. In an engaged condition of the sixth shift element S4, the first idler gear 9 is connected to the first shaft 3 in a rotationally fixed manner. In an engaged condition of the seventh shift element S5, the second idler gear 10 is connected to the first shaft 3 in a rotationally fixed manner.

Figure 11:
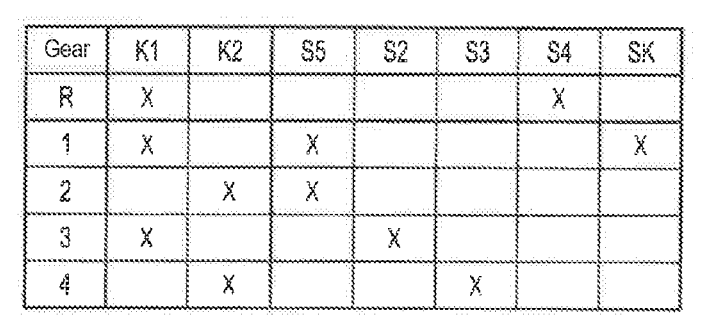

FIG. 11 shows a shift matrix for the exemplary embodiments shown in FIGS. 6 to 10. A reverse gear can be implemented by engaging the fourth shift element K1 and the sixth shift element S4, wherein the remaining shift elements are disengaged. A change-over from the reverse gear into the first forward gear can be implemented by disengaging the sixth shift element S4 and engaging the third and the seventh shift elements SK, S5, wherein the fourth shift element K1 is engaged and the remaining shift elements are disengaged. A change-over from the first forward gear into the second forward gear can be implemented by disengaging the fourth and the third shift elements K1, SK and by engaging the fifth shift element K2, wherein the seventh shift element S5 is engaged and the remaining shift elements are disengaged.

A change-over from the second forward gear into the third forward gear can be implemented by disengaging the fifth and the seventh shift elements K2, S5 and by engaging the fourth and the first elements K1, S2, wherein the remaining shift elements are disengaged. A change-over from the third forward gear into the fourth forward gear can be implemented by disengaging the fourth and the first shift elements K1, S2 and by engaging the fifth and the second shift elements K2, S3, wherein the remaining shift elements are disengaged.

Modifications and variations can be made to the embodiments illustrated or described herein without departing from the scope and spirit of the invention as set forth in the appended claims.

REFERENCE CHARACTERS 1 transmission
2 input shaft
3 first shaft
4 second shaft
5 transmission output shaft
6 first output gear
7 second output gear
8 output shaft gear
9 first idler gear
10 second idler gear
11 first other idler gear
12 second other idler gear
13 first fixed gear
14 second fixed gear
15 input shaft
16 connecting means
20 hollow shaft
21 solid shaft
K0 separating clutch
K1 fourth shift element
K2 fifth shift element
R further power transmission element
S2 first shift element
S3 second shift element
S4 sixth shift element
S5 seventh shift element
SK third shift element
EM electric machine
RE gear plane
VM internal combustion engine
RE1 first gear plane
RE2 second gear plane
SB1 first engagement means
SB2 second engagement means
SB3 third engagement means
SB4 fourth engagement means
SE1 first engagement device
SE2 second engagement device
SE3 third engagement device
SE4 fourth engagement device

The invention claimed is:

1. A transmission (1) for a motor vehicle, comprising:
at least one input shaft connectable to an internal combustion engine (VM) in a rotationally fixed manner, the at least one input shaft including at least one input shaft power transmission element;
a first shaft (3) including at least one power transmission element;
a second shaft (4) including at least one other power transmission element; and
a transmission output shaft (5) engaged with the first shaft (3) and the second shaft (4),
wherein the transmission (1) includes at least one gear plane (RE) in which the at least one input shaft power transmission element is engaged with the at least one power transmission element of the first shaft (3) and with the at least one other power transmission element of the second shaft (4),
wherein the at least one gear plane (RE) is no more than and precisely two gear planes, the at least one power transmission element of the first shaft (3) is an idler gear, and the at least one other power transmission element of the second shaft (4) is an idler gear, and
wherein a second engagement device (SE2) is arranged such that a first single component of a first gear plane (RE1) of the two gear planes is connected to a second single component of a second gear plane (RE2) of the two gear planes in a rotationally fixed manner when the second engagement device (SE2) is in an engaged position.

2. The transmission (1) of claim 1, wherein a first input shaft power transmission element of the at least one input shaft power transmission element is engaged with a first idler gear (9) and a first other idler gear (11) in a first gear plane (RE1) of the two gear planes.

3. The transmission (1) of claim 2, wherein a second input shaft power transmission element of the at least one input shaft power transmission element is engaged with a second idler gear (10) and a second other idler gear (12) in a second gear plane (RE2) of the two gear planes.

4. The transmission of claim 3, further comprising a fourth engagement device (SE4) arranged such that:
the first idler gear (9) is connected to the first shaft (3) in a rotationally fixed manner in a first engaged position of the fourth engagement device (SE4); and
the second idler gear (10) is connected to the first shaft (3) in a rotationally fixed manner in an engaged second position of the fourth engagement device (SE4).

5. The transmission (1) of claim 2, further comprising a first engagement device (SE1) arranged such that the first other idler gear (11) is connected to the second shaft (4) in a rotationally fixed manner when the first engagement device (SE1) is in an engaged position.

6. The transmission (1) of claim 2, further comprising a first engagement device (SE1) including a first shift element (S2), wherein the first other idler gear (11) is connected to the second shaft (4) in a rotationally fixed manner when the first engagement device (SE1) is in an engaged position.

7. The transmission of claim 2, further comprising a fourth engagement device (SE4) with a sixth shift element (S4), wherein the first idler gear (9) is connected to the first shaft (3) in a rotationally fixed manner when the sixth shift element (S4) is in an engaged position.

8. The transmission (1) of claim 1, wherein a second input shaft power transmission element of the at least one input shaft power transmission element is engaged with a second idler gear (10) and a second other idler gear (12) in a second gear plane (RE2) of the two gear planes.

9. The transmission of claim 8, further comprising a fourth engagement device (SE4) with a seventh shift element (S5), wherein the second idler gear (10) is connected to the first shaft (3) in a rotationally fixed manner when the seventh shift element (S5) is in an engaged position.

10. The transmission (1) of claim 1, wherein a first input shaft of the at least one input shaft is a hollow shaft (20) and a second input shaft of the at least one input shaft is a solid shaft (21).

11. The transmission (1) of claim 10, wherein a first input shaft power transmission element of the at least one input shaft power transmission element is connected to the hollow shaft in a rotationally fixed manner in a first gear plane (RE1) of the two gear planes.

12. The transmission (1) of claim 10, wherein a second input shaft power transmission element of the at least one input shaft power transmission element is connected to the solid shaft in a rotationally fixed manner in a second gear plane (RE2) of the two gear planes.

13. The transmission of claim 1, wherein the first single component of the first gear plane (RE1) and the second single component of the second gear plane (RE2) are not connected to the first shaft (3) or the second shaft (4) in a rotationally fixed manner.

14. The transmission of claim 1, further comprising a third engagement device (SE3), wherein the at least one input shaft is connectable to the internal combustion engine (VM) in a rotationally fixed manner by the third engagement device (SE3).

15. The transmission of claim 1, further comprising a third engagement device (SE3) with a fourth shift element (K1), wherein a hollow shaft (20) or a solid shaft (21) is connectable to the internal combustion engine (VM) in a rotationally fixed manner by the fourth shift element (K1).

16. The transmission of claim 15, wherein the third engagement device (SE3) also includes a fifth shift element (K2), and the hollow shaft (20) or the solid shaft (21) is connectable to the internal combustion engine (VM) in a rotationally fixed manner by the fifth shift element (K2).

17. The transmission of claim 16, wherein the third engagement device (SE3) is a dual clutch.

18. The transmission (1) of claim 1, further comprising a connecting means (16) and an electric machine (EM), the electric machine (EM) couplable to the transmission in a rotationally fixed manner with the connecting means (16).

19. The transmission (1) of claim 18, further comprising an input shaft (15) which is connected to a third engagement device (SE3) in a rotationally fixed manner, wherein the connecting means (16) is connected to the input shaft (15) in a rotationally fixed manner.

20. The transmission (1) of claim 18, wherein the connecting means (16) is connected to a third engagement device (SE3) in a rotationally fixed manner.

21. The transmission (1) of claim 18, wherein the connecting means (16) is connected to a hollow shaft (20) in a rotationally fixed manner.

22. The transmission (1) of claim 1, further comprising yet another power transmission element (R) that is engaged with the input shaft power transmission element and with one of the idler gears.

23. The transmission (1) of claim 1, further comprising yet another power transmission element (R), wherein:
a first input shaft power transmission element of the at least one input shaft power transmission element is engaged with a first idler gear (9) and a first other idler gear (11) in a first gear plane (RE1) of the two gear planes; and
the yet another power transmission element (R) is engaged with the first input shaft power transmission element and with the first idler gear (9) or with the first other idler gear (11).

24. The transmission (1) of claim 1, further comprising yet another power transmission element (R) that is arranged between the input shaft power transmission element and one of the idler gears.

25. The transmission (1) of claim 1, wherein the transmission is operable in a purely electric forward operation and in a purely electric reverse operation using a common gear.

26. The transmission (1) of claim 1, wherein the transmission is operable in precisely one purely electric forward gear.

27. The transmission (1) of claim 1, wherein the transmission is operable in precisely one purely electric reverse gear or purely internal combustion engine-driven reverse gear.

28. The transmission (1) of claim 1, wherein the transmission is operable in at least four forward gears with the internal combustion engine (VM) or in a forward gear with the internal combustion engine (VM) and an electric motor (EM).

29. The transmission (1) of claim 1, further comprising a first engagement device (SE1) including a first shift element (S2), wherein:
a first input shaft power transmission element of the at least one input shaft power transmission element is engaged with a first idler gear (9) and a first other idler gear (11) in a first gear plane (RE1) of the two gear planes;
the first other idler gear (11) is connected to the second shaft (4) in a rotationally fixed manner when the first engagement device (SE1) is in an engaged position; and
the transmission is operable in a purely electric forward gear or a purely electric reverse gear by engaging the first shift element (S2) and disengaging the remaining shift elements.

30. The transmission (1) of claim 1, further comprising a third engagement device (SE3) with a fourth shift element (K1) and a fifth shift element (K2), wherein:
a hollow shaft (20) or a solid shaft (21) is connectable to the internal combustion engine (VM) in a rotationally fixed manner by the fourth shift element (K1);
the hollow shaft (20) or the solid shaft (21) is connectable to the internal combustion engine (VM) in a rotationally fixed manner by the fifth shift element (K2); and
the transmission is operable in a purely electric forward gear or a purely electric reverse gear by engaging one or more of the fourth shift element (K1) and the fifth shift element (K2) and disengaging the remaining shift elements.

31. The transmission (1) of claim 1, further comprising a first engagement device (SE1) including a first shift element (S2) and a third engagement device (SE3) with a fourth shift element (K1), wherein:
- a first input shaft power transmission element of the at least one input shaft power transmission element is engaged with a first idler gear (9) and a first other idler gear (11) in a first gear plane (RE1) of the two gear planes;
- the first other idler gear (11) is connected to the second shaft (4) in a rotationally fixed manner when the first engagement device (SE1) is in an engaged position;
- a hollow shaft (20) or a solid shaft (21) is connectable to the internal combustion engine (VM) in a rotationally fixed manner by the fourth shift element (K1); and
- the internal combustion engine (VM) engages when the first shift element (S2) and the fourth shift element (K1) are engaged and the remaining shift elements are disengaged.

32. The transmission (1) of claim 1, further comprising a third engagement device (SE3) with a fourth shift element (K1) and a fifth shift element (K2), wherein:
- a hollow shaft (20) or a solid shaft (21) is connectable to the internal combustion engine (VM) in a rotationally fixed manner by the fourth shift element (K1);
- the hollow shaft (20) or the solid shaft (21) is connectable to the internal combustion engine (VM) in a rotationally fixed manner by the fifth shift element (K2); and
- a change-over from a forward gear into a reverse gear or vice versa is implementable by actuating the fourth shift element (K1) and the fifth shift element (K2).

33. The transmission (1) of claim 32, further comprising a fourth engagement device (SE4) with a sixth shift element (S4) and a seventh shift element (S5), wherein:
- a first input shaft power transmission element of the at least one input shaft power transmission element is engaged with a first idler gear (9) and a first other idler gear (11) in a first gear plane (RE1) of the two gear planes;
- the first idler gear (9) is connected to the first shaft (3) in a rotationally fixed manner when the sixth shift element (S4) is in an engaged position;
- the second idler gear (10) is connected to the first shaft (3) in a rotationally fixed manner when the seventh shift element (S5) is in an engaged position; and
- one or both of the sixth shift element (S4) and the seventh shift element (S5) is engaged and the remaining shift elements are disengaged during the change-over.

34. A hybrid drive for a motor vehicle, comprising the transmission (1) of claim 1, wherein the internal combustion engine (VM) is coupled to the transmission (1) and an electric motor (EM) is coupled to a connecting means (16) in a rotationally fixed manner.

35. The hybrid drive of claim 34, further comprising a separating clutch (K0), the internal combustion engine (VM) coupled to the transmission (1) via the separating clutch (K0).

36. A motor vehicle, comprising the transmission (1) of claim 1.

37. A motor vehicle, comprising the hybrid drive of claim 34.

38. A transmission (1) for a motor vehicle, comprising:
- at least one input shaft connectable to an internal combustion engine (VM) in a rotationally fixed manner, the at least one input shaft including at least one input shaft power transmission element;
- a first shaft (3) including at least one power transmission element;
- a second shaft (4) including at least one other power transmission element; and
- a transmission output shaft (5) engaged with the first shaft (3) and the second shaft (4),
- wherein the transmission (1) includes at least one gear plane (RE) in which the at least one input shaft power transmission element is engaged with the at least one power transmission element of the first shaft (3) and with the at least one other power transmission element of the second shaft (4),
- wherein the at least one gear plane (RE) is no more than and precisely two gear planes, the at least one power transmission element of the first shaft (3) is an idler gear, and the at least one other power transmission element of the second shaft (4) is an idler pear,
- wherein a second input shaft power transmission element of the at least one input shaft power transmission element is engaged with a second idler gear (10) and a second other idler gear (12) in a second gear plane (RE2) of the two gear planes, and
- wherein a second engagement device (SE2) is arranged such that
  - the second other idler gear (12) is connected to the second shaft (4) in a rotationally fixed manner when the second engagement device (SE2) in a first engaged position, and
  - the second other idler gear (12) is connected to the first other idler gear (11) in a rotationally fixed manner in a second engaged position.

39. A transmission (1) for a motor vehicle, comprising:
- at least one input shaft connectable to an internal combustion engine (VM) in a rotationally fixed manner, the at least one input shaft including at least one input shaft power transmission element;
- a first shaft (3) including at least one power transmission element;
- a second shaft (4) including at least one other power transmission element; and
- a transmission output shaft (5) engaged with the first shaft (3) and the second shaft (4),
- wherein the transmission (1) includes at least one gear plane (RE) in which the at least one input shaft power transmission element is engaged with the at least one power transmission element of the first shaft (3) and with the at least one other power transmission element of the second shaft (4),
- wherein the at least one gear plane (RE) is no more than and precisely two gear planes, the at least one power transmission element of the first shaft (3) is an idler gear, and the at least one other power transmission element of the second shaft (4) is an idler gear,
- wherein a second input shaft power transmission element of the at least one input shaft power transmission element is engaged with a second idler gear (10) and a second other idler gear (12) in a second gear plane (RE2) of the two gear planes, and
- wherein a second engagement device (SE2) including a second shift element (S3) and a third shift element (SK),
- wherein the second other idler gear (12) is connected to the second shaft (4) in a rotationally fixed manner when the second shift element (S3) is in an engaged position, and wherein the second other idler gear (12) is connected to the first other idler gear (11) in a rotationally fixed manner when third shift element (SK) is in an engaged position.

* * * * *